United States Patent [19]

Takahara et al.

[11] Patent Number: 4,468,978
[45] Date of Patent: Sep. 4, 1984

[54] STEERING WHEEL WITH A RESIN CORE

[75] Inventors: Michiyoshi Takahara; Nobuo Saegusa, both of Yokohama; Kazuyoshi Nishijima, Shizuoka, all of Japan

[73] Assignee: Nissan Motor Company, Limited, Yokohama, Japan

[21] Appl. No.: 283,796

[22] Filed: Jul. 16, 1981

[30] Foreign Application Priority Data

Sep. 26, 1980 [JP] Japan ............................... 55-134878

[51] Int. Cl.³ .............................................. B62D 1/04
[52] U.S. Cl. ...................................................... 74/552
[58] Field of Search .......................... 74/552; 29/159 B

[56] References Cited

U.S. PATENT DOCUMENTS 3,555,925 1/1971 Bowser .................................. 74/552
3,714,844 2/1973 Tsuda .................................... 74/552
4,201,830 5/1980 Wollen .................................. 428/375

FOREIGN PATENT DOCUMENTS 1970385 10/1967 Fed. Rep. of Germany .
1278858  9/1968 Fed. Rep. of Germany .
2351747  5/1974 Fed. Rep. of Germany .
1421826 11/1965 France .
1418811 12/1975 United Kingdom .
1571902  7/1980 United Kingdom .

Primary Examiner—Kenneth Dorner
Attorney, Agent, or Firm—Lane, Aitken & Kananen

[57] ABSTRACT

An improved steering wheel has a reinforcement member extending through a resin core. The reinforcement member is provided in a central connecting portion where the steering wheel is engaged with a steering shaft, a spoke portion or portions extending radially from the central portion, and at least the parts of the grip portion where the grip portion is connected with the spoke portion. The reinforcement member is made of metal of thin cross-section so that the weight thereof does not seriously interfere with formation of a lightweight steering wheel.

3 Claims, 6 Drawing Figures

STEERING WHEEL WITH A RESIN CORE

BACKGROUND OF THE INVENTION

The present invention relates generally to a steering wheel for an automotive vehicle, motor boat, and the like. More specifically, the invention relates to an improvement in a light weight steering wheel with a resin core.

For preventing steering wheel vibration, steering wheels with cores of synthetic resin have been proposed and developed recently. In such a steering wheel, a synthetic resin of high elastic modulus such as polybutylene, nylon resin, or the like is used for making the core. In the prior art, the core is provided with an elastic modulus of 30,000 kg/cm$^2$ to 70,000 kg/cm$^2$. For the steering wheel having diametrically extending spokes, the elastic modulus of the resin core is enough to resist the bending moment. However, various designs of steering wheels are proposed. For example, FIGS. 1 and 2 show examples of variations in steering wheels. As seen in FIGS. 1 and 2, a grip portion 1 is supported at the top of a steering shaft 2 by spokes 3 in cantilever fashion. In FIG. 1, the angle $\theta$ subtended by the two spokes 3 is about 90°. In FIG. 2, the grip portion 1 is supported by a single spoke 3. In such constructions, particularly in the portion constituting the longer cantilever with respect to the connected portion P in FIG. 1 or the grip of FIG. 2, resistance to stress due to the bending moment of the resin core is insufficient. This leads to a limitation of possible resin steering wheel constructions.

SUMMARY OF THE INVENTION

Therefore, it is an object of the present invention to provide a steering wheel having a synthetic resin core with a reinforcement member.

Another object of the invention is to provide an improvement in a steering wheel with the resin core incorporating a reinforcement member in the spoke and at least part of the grip for providing enough resistance to stress due to the bending moment to construct the steering wheel in any desired design.

To accomplish the above-mentioned and other objects, there is provided an improved steering wheel having a reinforcement member extending through a resin core. The reinforcement member is provided in a central connecting portion where the steering wheel is engaged with a steering shaft, a spoke portion or portions extending radially from the central portion, and at least the parts of the grip portion where the grip portion is connected with the spoke portion. The reinforcement member is made of metal of thin cross-section so that the weight thereof may not seriously interfere with formation of a light-weight steering wheel.

According to the present invention, there is provided an improved steering wheel comprising an annular grip portion constructed of an inner core made of metal, an outer core comprising a first resin layer made of synthetic resin of relatively high elastic modulus and surrounding the entire periphery of said inner core, and an outer member comprising a second resin layer made of relatively soft synthetic resin and surrounding the outer core, a cylindrical central portion constructed of a cylindrical inner core made of metal, an outer core made of synthetic resin of relatively high elastic modulus and surrounding the entire periphery of said cylindrical inner core, and an outer member made of relatively soft synthetic resin, the inner core having a means for engaging with the top of a steering shaft for rotation therewith, and a spoke portion radially extending between the grip portion and the central portion and constructed of an inner core extending between said inner core of the grip portion and the central portion and connected therewith at both ends, an outer core extending between the outer core of the grip portion and said central portion and surrounding said inner core of the spoke portion, and an outer member surrounding the entire periphery of the outer core, the inner core being made of metal, the outer core being made of synthetic resin of relatively high elastic modulus, and the outer member being made of relatively soft synthetic resin.

BRIEF DESCRIPTION OF THE DRAWINGS

The present invention will be more fully understood from the detailed description of the invention given herebelow and from the accompanying drawings of the preferred embodiments, which, however, are not to be taken as limiting the present invention, but rather are for elucidation and explanation only.

DESCRIPTION OF THE PREFERRED EMBODIMENT

Figure 1:
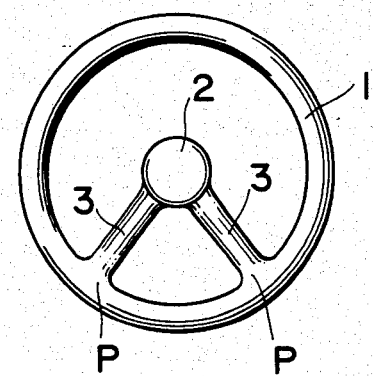
FIGS. 1 and 2 are plan views of steering wheels showing variations of the design therefor.
Figure 2:
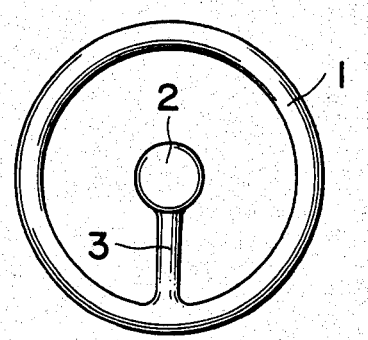
Figure 3:
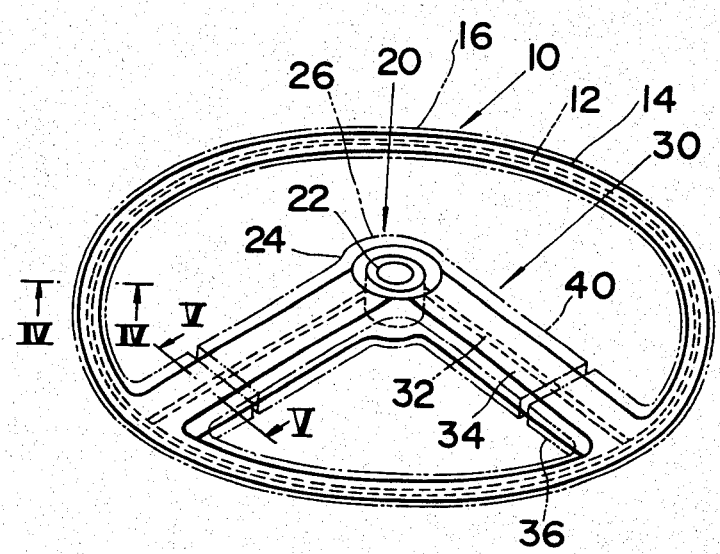
FIG. 3 is a fragmentary perspective view of the preferred embodiment of a steering wheel according to the present invention.
Figure 4:
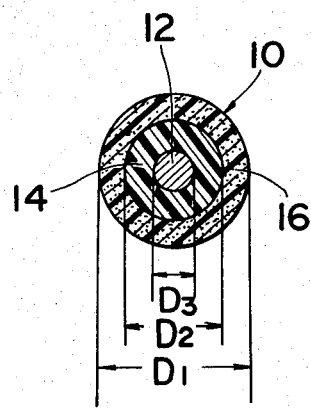
FIG. 4 is a cross section of the grip portion of the steering wheel of FIG. 3, taken along line IV—IV of FIG. 3.
Figure 5:
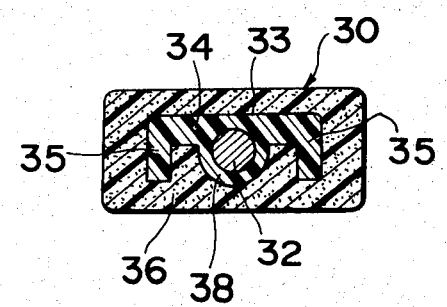
FIG. 5 is a cross section of the spoke portion of the steering wheel of FIG. 3, taken along line V—V of FIG. 3.

Referring now to FIGS. 3 to 5, there is illustrated a preferred embodiment of a light-weight steering wheel for an automotive vehicle, motor boat, and the like, in accordance with the present invention. The steering wheel comprises an annular grip portion 10, a central connecting portion 20 where the steering wheel is engaged with a steering shaft (not shown), and one or more spoke portions 30 radially extending from the central portion 20 to the grip portion. Between the central portion 20 and the top of the steering shaft, there is provided a means for establishing engagement in order to couple the steering wheel with the steering shaft which rotatably extends through a steering column (not shown). The means for engaging the steering wheel and the steering shaft is of any suitable construction.

In the shown embodiment, a horn mechanism including a horn pad 40 is provided in the spoke portion 30. Although the horn mechanism with the horn pad 40 is provided in the spoke portion in this embodiment, they can be located in any suitable place and manner. For example, as is per se well-known, the horn mechanism with the horn pad 40 can be placed at the central portion 20 of the steering wheel.

As shown in FIGS. 3 and 4, the grip portion 10 comprises inner and outer cores 12 and 14 and an outer member 16. The inner core 12 is made of a relatively rigid metal such as stainless steel or the like. The outer core 14 constitutes a first resin layer surrounding core 12 and is made of a synthetic resin having elastic modulus more than 30,000 kg/cm$^2$, and preferably more than 70,000 kg/cm$^2$. The synthetic resin used for the outer core is selected from materials available in the market, for example, a polyvinyl acetate, such as polyvinyl terephthalate, polybutylene, nylon resin, or nylon resin with glass fiber, and so on. For example, the nylon resin with glass fiber for the core is available from E. I. Du Pont de Nemours & Co. under the trademark "Zintel". On the other hand, the outer member 16 constitutes a second resin layer surrounding the first resin layer or outer core 14 and is made of relatively soft synthetic resin, such as, for example, polypropylene, polyvinylchloride resin, polyurethane, and so on. In the shown embodiment, the diameter $D_3$ of the inner core 12 is about 6 mm, the diameter $D_2$ of the outer core 14 is about 18 mm, and the diameter $D_1$ of the outer member 16 is 24 mm.

As shown in FIGS. 3 and 5, the spoke portion 30, as similar to that of the grip portion 10, comprises inner and outer cores 32 and 34 and an outer member 36. As drawn in FIG. 5, the outer core 34 has a horizontal major section 33 and vertical sections 35 vertically appending from both sides of the horizontal section. A rib 38 is provided on the lower central portion of the major section 33 of the outer core 34 longitudinally extending parallel to the vertical sections 35. The inner core 32 extends through the rib 38. The outer end of the inner core 32 is connected with the inner core 12 of the grip portion 10. Similarly to the grip portion 10, the inner core is made of metal and the outer core is made of a same synthetic resin as that forming the outer core 14 of the grip portion 10. The outer member 36 surrounds the outer core 34 and is formed into a rectangular configuration.

It should be appreciated that the spoke portion 30 can be formed in any suitable shape and should not be limited to the shown configuration. It is also to be appreciated that the inner core 32 of the spoke portion 30 has the same diameter as that of the inner core 12 of the grip portion.

The inner ends of the inner and outer cores 32 and 34 are respectively connected with cylindrical inner and outer cores 22 and 24 of the central portion 20, as shown in FIG. 3. The inner and outer cores 22 and 24 are coaxially arranged with respect to one another. The inner core 22 extends through the outer core 24 and thereby the inner and outer cores 22 and 24 are engaged for rotation together. On the other hand, the inner core 22 is engaged with the steering shaft for cooperation therewith by way of spline engagement, for example.

In the above-described embodiment, the steering wheel can be provided with sufficient strength against the bending moment applied thereto during the steering operation and this permits various designs which are otherwise impossible. Here, since the core of the metal is of relatively small diameter in comparison with that of a conventional one having a solid metal core and with the diameter of the outer resin core and outer member, the steering wheel of the present embodiment is still light enough to prevent steering wheel vibration.

Furthermore, due to the metal inner core, the steering wheel is strong enough to prevent breaking.

Figure 6:
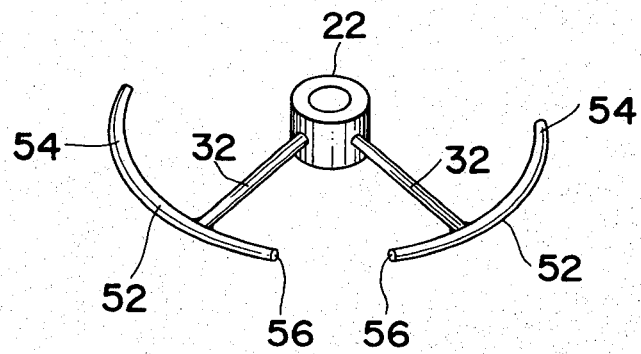
FIG. 6 is a perspective view of a reinforcement member employed in another embodiment of the steering wheel according to the present invention.

Now, referring to FIG. 6, there is illustrated an inner core of another embodiment of the present invention. In this embodiment, the inner cores 22 and 32 of the central portion 20 and the spoke portion 30 are substantially the same as those of foregoing embodiment. The inner cores 52 of the grip portion 10 do not extend along the entirety of the grip portion. Each of the inner cores 52 has a longer section 54 and a shorter section 56 as shown in FIG. 6. The longer section 54 is placed along the portion constituting the longer cantilever than that of the remainder. Although the inner core 52 does not extend completely along the entirety of the grip portion, the inner core can provide sufficient stress against the bending moment applied to the grip portion.

According to this embodiment, the weight of the steering wheel can be reduced in relation to that of the former embodiment and the steering wheel can still have sufficient ridigity.

Although the steering wheel has spokes arranged at an angle 90°, the invention, is not limited to this specific construction. The improvement of the invention can be applied to any of various designs of the steering wheel. Further, the configuration and construction of the invention can be embodied otherwise without departing from the principle of the invention.

What is claimed is:

1. A steering wheel comprising:
    a central portion including a cylindrical metal core engageable to a steering shaft, a first resin layer surrounding said cylindrical metal core and having an elastic modulus sufficient for resisting against bending stress applied to the steering wheel, and a second resin layer of substantially soft material and surrounding said first resin layer;
    a spoke portion having and extending from said central portion and including a first metal core extending from said cylindrical metal core substantially along the axis of said spoke portion, said first resin layer surrounding said first metal core, wherein said first resin layer surrounding said first metal core has a horizontally elongated rectangular cross section with vertically aligned reinforcement ribs respectively extending along the axis of said spoke portion in parallel relationship with respect to each other; and
    a rim portion including a first rim portion and a second rim portion, said first rim portion having a second metal core connected to said first metal core of said spoke portion, said first resin layer surrounding said second metal core and said second resin layer surrounding said first resin layer, and said second rim portion having said first resin layer and said second resin layer in coaxial arrangement.

2. A steering wheel as set forth in claim 1, wherein said first resin layer surrounding said first metal core has a substantially E-shaped cross section.

3. A steering wheel as set forth in claim 2, wherein said first metal core extends through an intermediate rib.

* * * * *